July 11, 1944.  J. D. BELL  2,353,285
POWER TRANSMITTING DEVICE
Filed April 11, 1942  3 Sheets-Sheet 1
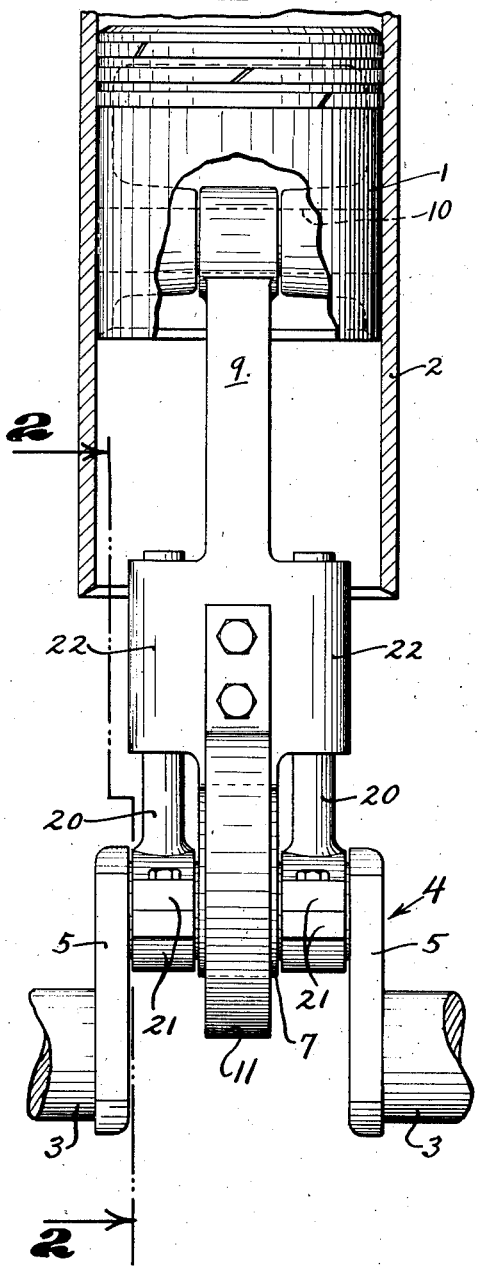
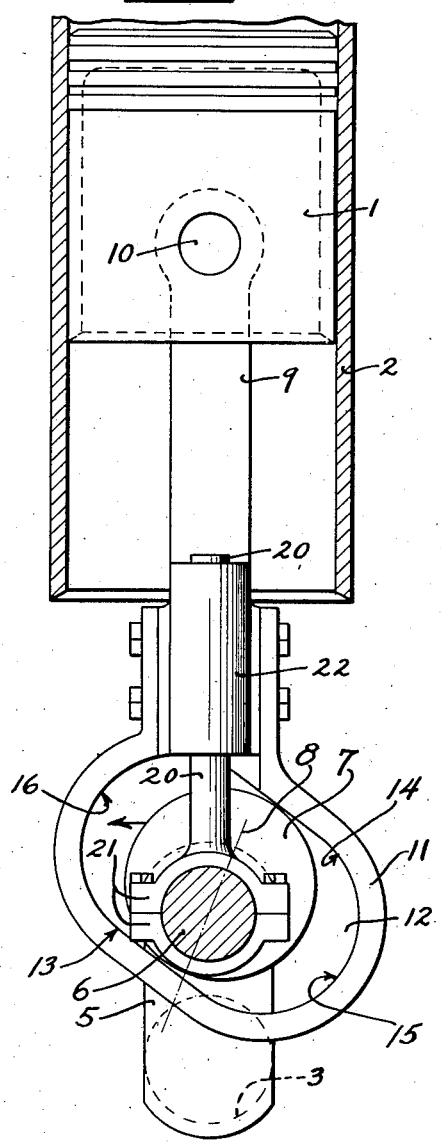
INVENTOR,
Joseph D. Bell July 11, 1944.  J. D. BELL  2,353,285
POWER TRANSMITTING DEVICE
Filed April 11, 1942   3 Sheets-Sheet 3
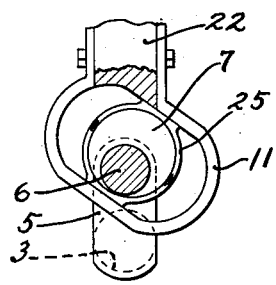
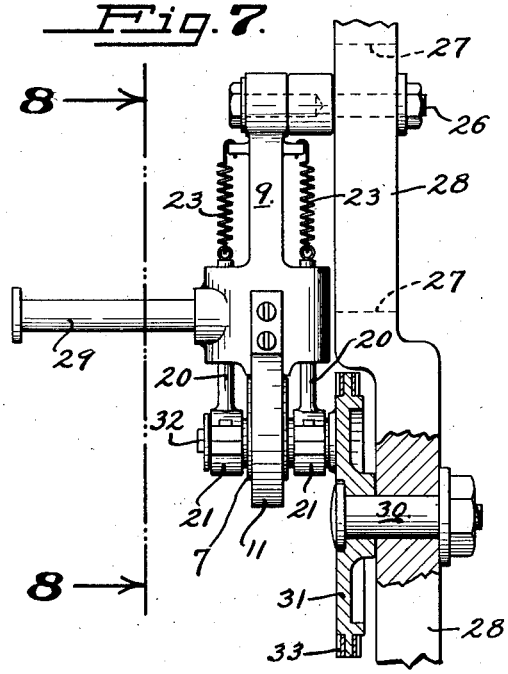
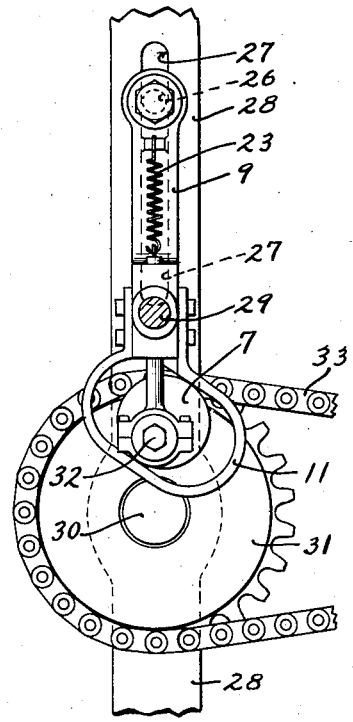
INVENTOR,
Joseph D. Bell Patented July 11, 1944

2,353,285

UNITED STATES PATENT OFFICE 2,353,285

POWER TRANSMITTING DEVICE

Joseph D. Bell, San Francisco, Calif.

Application April 11, 1942, Serial No. 438,658

21 Claims. (Cl. 74—44)

The present invention relates to improvements in power transmitting devices and its principal object is to provide improved means for transmitting motion from a reciprocating member, such as the piston of an engine of suitable type, to a rotary member, such as a crank shaft.

The present application is a further development of the invention disclosed in my co-pending application Ser. No. 434,094, for Letters Patent on an engine, and contemplates the use of a wedge drive for forcing the crank past dead center and through the first portion of the rotary path where the conventional connecting rod drive develops only a low degree of efficiency because the connecting rod and the crank are too nearly alined.

It is further proposed to combine the initial wedge drive, counting from upper dead center (the dead center at the beginning of the drive stroke), with the conventional connecting rod drive, in such a manner that the latter takes over when the crank reaches a more favorable position for the latter drive, somewhere between upper dead center and a position at a right angle thereto.

It is further proposed to utilize for the wedge drive a cam on the crank pin whereby the leverage of the wedge on the crank is increased and the drive is made to operate to better advantage.

It is a further object of the invention to utilize the crank pin itself as a guide means for the wedge whereby the latter is made to follow the crank pin in its rotary movement and to remain in driving relation with the cam.

It is further proposed to provide structural features whereby the change from the wedge drive to the conventional connecting rod drive takes place without any break or interruption in the movement of the respective parts and one drive runs smoothly into the other drive.

And finally it is proposed to arrange the wedge in the form of a slotted member forming one end of the connecting rod whereby the wedge remains in continuous contact with the cam and the latter is enabled to drive the piston or reciprocating member on the return stroke.

Further objects and advantages of my invention will appear as the specification proceeds.

Figure 3:
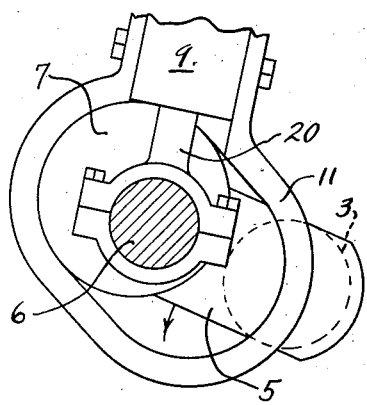
Figure 4:
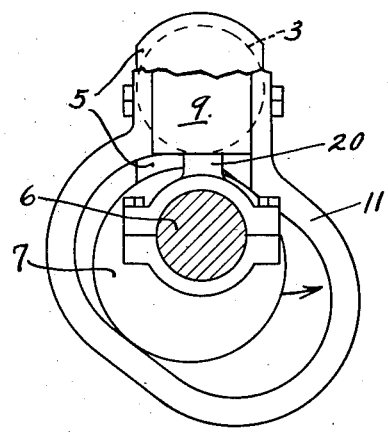
Figure 5:
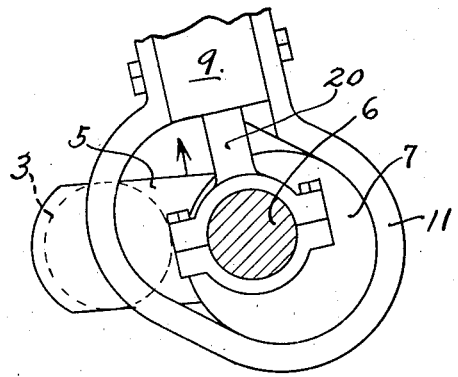

The preferred form of my invention is illustrated in the accompanying drawings, in which Figure 1 shows an elevation of my power transmitting device, portions being shown in section or broken away;

Figure 2, a section taken along line 2—2 of Figure 1, both Figures 1 and 2 showing the crank at upper dead center;

Figure 3, a fragmentary view showing the driving mechanism in position when the crank is well past dead center and approaching a right-angular position, in which position the shift takes place from wedge-drive to conventional connecting rod drive;

Figure 4, a similar view showing the crank at bottom dead center;

Figure 5, a similar view showing the crank well past bottom dead center;

Figure 6, a fragmentary view showing a sliding bearing interposed between the crank pin and the slotted member;

Figure 7, a fragmentary view in elevation of the driving mechanism applied to a different actuating means, as, for instance, the foot-pedal of a bicycle;

Figure 8, a section taken along line 8—8 of Figure 7; and

Figure 9:
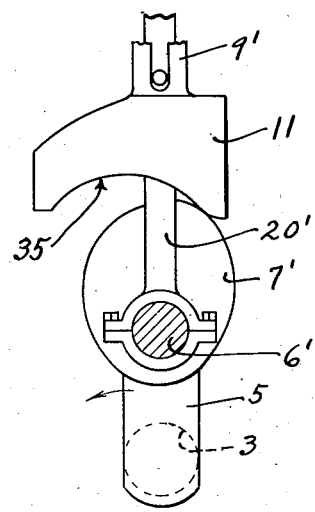

Figure 9, a modified form of the invention.

While I have shown only the preferred forms of the invention I wish to have it understood that various changes or modifications may be made within the scope of the claims attached hereto without departing from the spirit of the invention.

Referring to the drawings in detail, and particularly to the form shown in Figures 1–5, the piston 1 is mounted for reciprocating movement in the cylinder 2 and may be actuated in any suitable manner. A shaft 3 is mounted opposite the open end of the cylinder and at a right angle to the axis thereof, in a conventional manner. The shaft is formed with a crank 4 having two crank arms 5 and a crank pin 6 fixed between the outer ends of the arms. The crank pin has a cam 7 fixed thereon, the cam being circular in form and mounted eccentrically with respect to the crank pin in such a manner that a line 8 connecting the two centers slants slightly backward with respect to the axis of the cylinder when the crank is at upper dead center, as in Figure 2.

A connecting rod 9 is pivoted to the piston in the conventional manner as at 10 and terminates, at its free end, in a slotted member or cage 11 adapted to receive the cam 7 therein. The slot 12 in the cage is of a width slightly in excess of the diameter of the cam so as to have a loose fit with the latter, while the length of the slot is greater than the width. The slot runs at an angle to the axis of the cylinder so that the long axis of the slot slants forward with respect to the cylinder axis when the crank is at top dead center, as clearly appears from Figure 2.

The slot is generally elliptic in form and is defined by two elongated straight walls 13 and 14 and circular or rounded end walls 15 and 16 forming annular pockets 17 and 18.

Of principal interest for the present invention are the upper straight wall 14 and the adjacent upper circular wall 16 forming the pocket 18. The straight wall 14 engages the cam slightly rearward of the common center line 8, and when the cage 11 is forced downward by the piston movement and is prevented from backing away, by means to be described later, the straight wall 14 acts like a wedge and drives the cam and the crank pin past dead center.

For holding the straight face 14, which may be hereinafter referred to as a wedge-face, in driving relation with the cam, I provide a pair of plungers 20 which are pivoted to the crank pin as at 21, preferably on opposite sides of the cam and which are slidably mounted on the connecting rod 9, preferably in guides 22 running parallel to the connecting rod.

It will be noted that when the wedge-face 14 bears on the cam and the piston moves downward, the wedge-face sliding down on the cam forces the same and the crank pin across dead center and that at the same time the crank pin 6, through the plungers 20, forces the cage to follow the cam and to revolve with the same.

After the cam has thus been wedged past center and when it approaches the position of Figure 3, the cage has traveled down on the cam sufficiently far for the end wall 16 to reach the cam and the latter now takes over the load and continues the drive in a manner corresponding substantially to that of the conventional connecting rod drive. It will be noted that the transition from one drive to the other is absolutely smooth and without any break during the transition period. As a matter of fact the entire movement may be described as one continuous movement, with the wedge-face first wedging the cam across dead center, substantially to the position of Figure 3, and then pushing the cam, substantially to the bottom of the stroke.

When the crank reaches bottom center the parts assume the position shown in Figure 4, with the major cam axis just opposite to its initial position. On further rotary movement the cam, actuated by fly wheel momentum or some other driving force, such as a second piston active on the same shaft, bears again on the wedge-face 14, under the influence of the plunger 20, and, passing through the position of Figure 5, forces the piston back to its original position as in Figure 2, until the major cam axis 8 passes the point of contact which signifies the beginning of a new drive stroke for the piston.

The form shown in Figure 6 operates substantially in the same manner and its only structural difference lies in the provision of a sliding bearing 25 introduced between the cam 7 and the walls of the slot 12 of the cage.

In the form shown in Figures 7 and 8 the same principle is applied to a different drive mechanism, such as might be employed in connection with a bicycle. The upper end of the connecting rod 9 is connected to a pin 26 (corresponding to the wrist pin 10 in the previous form) and this pin is guided for vertical reciprocating movement in a slot 27 in a suitable frame member 28, which latter may be part of the bicycle frame. The pin may be reciprocated by means of a horizontal shaft 29 projecting from any suitable part of the connecting rod, the latter shaft representing the foot pedal of a bicycle and being operated by the foot of an operator seated on the bicycle.

The crank shaft of the previous form is represented by the shaft 30 mounted in the frame 28, a sprocket wheel 31 mounted on the shaft and a pin 32 projecting eccentrically from the sprocket wheel, this pin corresponding to the crank pin of the crank shaft. The pin has the cam 7 mounted thereon and the cam operates in the slotted cage 11 secured to the free end of the connecting rod 9, in the same manner as previously described.

The pin 32 is guided for holding the cage in driving relation to the cam by means of the plungers 20 which correspond to those of the form shown in Figures 1 to 5. A chain 33 trained over the sprocket wheel may transmit motion to a smaller sprocket wheel secured to the rear wheel of the bicycle, in the conventional manner. Springs 23 may be added to cushion the plunger movement.

It will be particularly noted that in my new drive mechanism the cage with its wedge face begins the actual driving action even before the crank reaches dead center and continues the drive until the crank reaches the opposite dead center, thus actually securing a driving effect through an angle of more than 180 degrees. The drive begins in a wedging action and changes to pushing action only after the crank pin is well beyond dead center and has reached a position where the pushing action works on the crank with a high degree of efficiency.

The leverage gained by the provision of the cam depends, of course, upon the diameter of the cam, and the latter will be determined with regard to the proposed speed of the engine. For a slow engine the diameter may be relatively large, and for a speed engine it may be shortened to some extent. The crank length should also be considered. The further the cam extends outward from the crank pin, the more leverage the wedge will have to force the pin in the direction of its rotation.

It will be noted by reference to Figure 2 of my co-pending application that the length of the bearing surface of the wedge-face 27 has been increased and that the equivalent of the cam 9 has been rounded. This was done to smooth out the action and to continue the push on the cam and thus to take advantage of a longer crank leverage for as great a length of travel as possible.

Figure 9 shows a simplified form of the invention with modified features. The cam 7' is fixed to the crank pin 6' in the same manner as previously described, but is made oval or egg-shaped in form. The crank pin is connected to the connecting rod 9' by the sliding plunger 20' in the manner previously described.

The connecting rod 9' terminates, at its free end, in a fragmentary cage, which, instead of having a complete slot, as in the former figures, merely shows a concave driving face 35, which engages the tip of the cam before the latter reaches top dead center, as shown in the drawings, drives the same, by a wedging action, across dead center and finally continues the drive by pushing on the broad oval face of the cam until the latter substantially reaches bottom dead center.

During all this time, as well as during the return stroke, the cage 11 is held to the cam and in driving relation therewith by the plunger 20'.

It is apparent that the crankshaft, the crank with its pin and the cam may be considered a single unit, or merely as a shaft including a cam, and that the end of the plunger may be pivoted to the shaft or the cam at any suitable point, including the center of the shaft, as long as it serves the purpose of a pry member for holding the wedge-face in driving relation with the cam.

I claim:

1. In a power transmitting device, a reciprocating member, a rotary member having a crank therein and having a cam on the crank, a connecting rod pivoted to the reciprocating member and having a wedge-face active on the cam for driving the latter past dead center when the reciprocating member moves toward the shaft, and means operable to cause the wedge-face to follow the crank for maintaining driving relation between the wedge-face and the crank.

2. In a power transmitting device, a reciprocating member, a rotary member having a crank therein and having a cam on the crank, a connecting rod pivoted to the reciprocating member and having a wedge-face active on the cam for driving the latter past dead center when the reciprocating member moves toward the shaft, and a member engaging the crank with freedom of traveling movement lengthwise of the connecting rod for causing the wedge-face to follow the crank for maintaining driving relation between the wedge-face and the crank.

3. In a power transmitting device, a reciprocating member, a rotary member having a crank therein and a cam on said crank projecting toward the reciprocating member with a slight rearward incline when the crank is at dead center, a connecting rod pivoted to the reciprocating member and having a wedge-face bearing on the cam for driving the crank past dead center when the reciprocating member moves toward the shaft, and a means operable to cause the wedge-face to follow the cam for maintaining driving relation between the wedge-face and the cam.

4. In a power transmitting device, a reciprocating member, a rotary member having a crank therein and a cam on said crank projecting toward the reciprocating member with a slight rearward incline when the crank is at dead center, a connecting rod pivoted to the reciprocating member and having a wedge-face bearing on the cam for driving the crank past dead center when the reciprocating member moves toward the shaft, and a member slidable in the connecting rod and pivoted to the crank for causing the wedge-face to follow the crank for maintaining driving relation between the wedge-face and the cam.

5. In a power transmitting device, a reciprocating member, a rotary member having a crank therein and having a cam on the crank, a connecting rod pivoted to the reciprocating member and having a wedge-face active on the cam for driving the latter past dead center when the reciprocating member moves toward the shaft, means operable to cause the wedge-face to follow the crank for maintaining driving relation between the wedge-face and the crank, the wedge-face connecting into a pocket adapted to enter into driving engagement with the crank after the latter is well past dead center for continuing the drive.

6. In a power transmitting device, a reciprocating member, a rotary member having a crank therein, a connecting rod pivoted to the reciprocating member and having a wedge-face active on the crank for driving the latter past dead center when the reciprocating member moves toward the shaft, and a member slidable in the connecting rod and pivoted to the crank for causing the wedge-face to follow the crank for maintaining driving relation between the wedge-face and the crank, the wedge-face connecting into a pocket adapted to enter into driving engagement with the crank after the latter is well past dead center for continuing the drive.

7. In a power transmitting device, a reciprocating member, a rotary member having a crank therein and a cam on said crank projecting toward the reciprocating member with a slight rearward incline when the crank is at dead center, a connecting rod pivoted to the reciprocating member and having a wedge-face bearing on the cam for driving the crank past dead center when the reciprocating member moves toward the shaft, and a means operable to cause the wedge-face to follow the cam for maintaining driving relation between the wedge-face and the cam, the wedge-face connecting with a pocket adapted to enter into driving engagement wtih the cam after the latter is well past dead center for continuing the drive.

8. In a power transmitting device, a reciprocating member, a rotary member having a crank therein and a cam on said crank projecting toward the reciprocating member with a slight rearward incline when the crank is at dead center, a connecting rod pivoted to the reciprocating member and having a wedge-face bearing on the cam for driving the crank past dead center when the reciprocating member moves toward the shaft, and a member slidable in the connecting rod and pivoted to the crank for causing the wedge-face to follow the crank for maintaining driving relation between the wedge-face and the cam, the wedge-face connecting into a pocket adapted to enter into driving engagement with the cam after the latter is well past dead center for continuing the drive.

9. In a power transmitting device, a reciprocating member, a rotary member having a crank therein, and connecting means between the two members operable to wedge the crank across one dead center and to push it substantially to the opposite dead center in one continuous drive, the said means comprising a connecting rod pivoted to the reciprocating member and having a slidable extension pivoted to the crank, and a cam on the crank and a slotted member on the connecting rod arranged in driving relation to the cam.

10. In a power transmitting device, a rotary shaft having a crank therein, a reciprocating member mounted opposite the shaft, a circular cam mounted eccentrically on the crank, with the axis of the cam and the crank inclined rearwardly with respect to the direction of rotation when the crank is at dead center, and a connecting rod pivoted to the reciprocating member and having a slot engaging over the cam for driving the same, the axis of the slot being arranged at a forward angle with respect to crank, and means for holding the slotted end in driving relation with the cam.

11. In a power transmitting device, a rotary shaft having a crank therein, a reciprocating member mounted opposite the shaft, a circular cam mounted eccentrically on the crank, with the axis of the cam and the crank inclined rearwardly with respect to the direction of rotation when the crank is at dead center, and a connecting rod pivoted to the reciprocating member and having a slot engaging over the cam for driving the same, the axis of the slot being arranged at a forward angle with respect to crank, and means for holding the slotted end in driving relation with the cam, the latter means comprising a member slidable on the connecting rod and pivoted to the crank.

12. In a power transmitting device, a reciprocating member, a rotary member including a cam, a connecting rod pivoted to the reciprocating member and having a wedge-face active on the cam for driving the latter when the reciprocating member moves toward the shaft, and a plunger slidable on the connecting rod and pivoted to the rotary member for holding the wedge-face in driving relation to the cam.

13. In a power transmitting device, a reciprocating member, a rotary member having a crank therein and having a cam on the crank, a connecting rod pivoted to the reciprocating member and having a wedge-face active on the cam for driving the latter when the reciprocating member moves toward the shaft, and means on the connecting rod operable to cause the wedge-face to follow the crank for maintaining driving relation between the wedge-face and the crank.

14. In a wedge drive of the character described, a revolvable shaft having crank arms and a crank pin supported therein, a driving member mounted for reciprocating motion in a plane with the shaft, an eccentric on the pin having its major axis arranged at a slight rearward incline in the direction of rotation to the crank arms when the latter point toward the driving member, a connecting rod pivoted to the driving member and having a cage at its free end with an elongated slot engaging over the eccentric intermediate the length of the slot and rearwardly of the major axis of the eccentric, the major axis of the slot being arranged at a forward incline to the crank arms in the position specified whereby an intermediate section of the rear wall of the slot is made to bear on the eccentric rearwardly of its major axis for wedging the cam forward in the direction of rotation when the driving member moves toward the shaft, and a plunger mounted on the connecting rod with freedom of endwise sliding movement and having a bearing at its free end engaging over the crank pin for holding the cage in wedging relation to the eccentric.

15. In a wedge drive of the character described, a revolvable shaft having crank arms and a crank pin supported therein, a driving member mounted for reciprocating motion in a plane with the shaft, an eccentric on the pin having its major axis arranged at a slight rearward incline with respect to the direction of rotation when the crank arms point toward the driving member, a connecting rod pivoted to the driving member and having a wedging member at its free end engaging the eccentric rearwardly of the major axis of the latter and at a point spaced from the axis of the rod in the position specified for wedging the eccentric forward in the direction of rotation when the driving member moves toward the shaft, and a plunger mounted on the connecting rod with freedom of endwise sliding movement and having a bearing at its free end engaging over the crank pin for holding the wedge member in driving relation to the eccentric.

16. In an engine, a rotatable shaft having a crank pin and a cam made a part thereof, a piston having a piston rod connected thereto, the latter having a wedging member formed thereon, the said rod being connected to said pin for movement therewith and for holding the wedging member against side pressure when the latter is forced against the cam for rotating the shaft.

17. In an engine, a rotatable shaft having a crank pin and a cam made a part thereof, a piston having a piston rod connected thereto, the latter having a wedging member forming a rigid part thereof, the said rod being connected to said pin for movement therewith and for holding the wedging member against side pressure when the latter is forced against the cam for rotating the shaft.

18. In a power transmitting device, a rotary member having a crank therein and a cam on said crank, a reciprocating member, means for guiding the same radially with respect to the rotary member, a connecting rod pivoted to the reciprocating member, a loop on the rod cooperable with the cam for wedging the same through dead center, and means for holding the loop in driving relation with the cam.

19. In a power transmitting device, a rotary member having a crank therein and a cam on said crank, a reciprocating member, means for guiding the same radially with respect to the rotary member, a connecting rod pivoted to the reciprocating member, a loop on the rod cooperable with the cam for wedging the same through dead center, and means for holding the loop in driving relation with the cam, the rod having a member projecting laterally from an intermediate portion thereof to serve as a drive member for the rod.

20. In a power transmitting device, a rotary member having a crank therein and a cam on said crank, a reciprocating member, means for guiding the same radially with respect to the rotary member, a connecting rod pivoted to the reciprocating member, a loop on the rod cooperable with the cam for wedging the same through dead center, and means for holding the loop in driving relation with the cam, the rod having a member projecting laterally from an intermediate portion thereof to serve as a drive member for the rod and having spring means urging the rod into an opposite direction.

21. In a power transmitting device, a rotary member having a crank therein and an eccentric cam on the crank, a bearing member revolvable on the cam, a reciprocating member, means for guiding the same radially with respect to the rotary member, a connecting rod pivoted to the reciprocating member, a loop on the rod cooperable with the bearing member for wedging the cam through dead center, and means for holding the loop in driving relation with the cam.

JOSEPH D. BELL.